(No Model.)
G. B. GRANT.
BEVEL GEAR.
No. 519,572. Patented May 8, 1894.
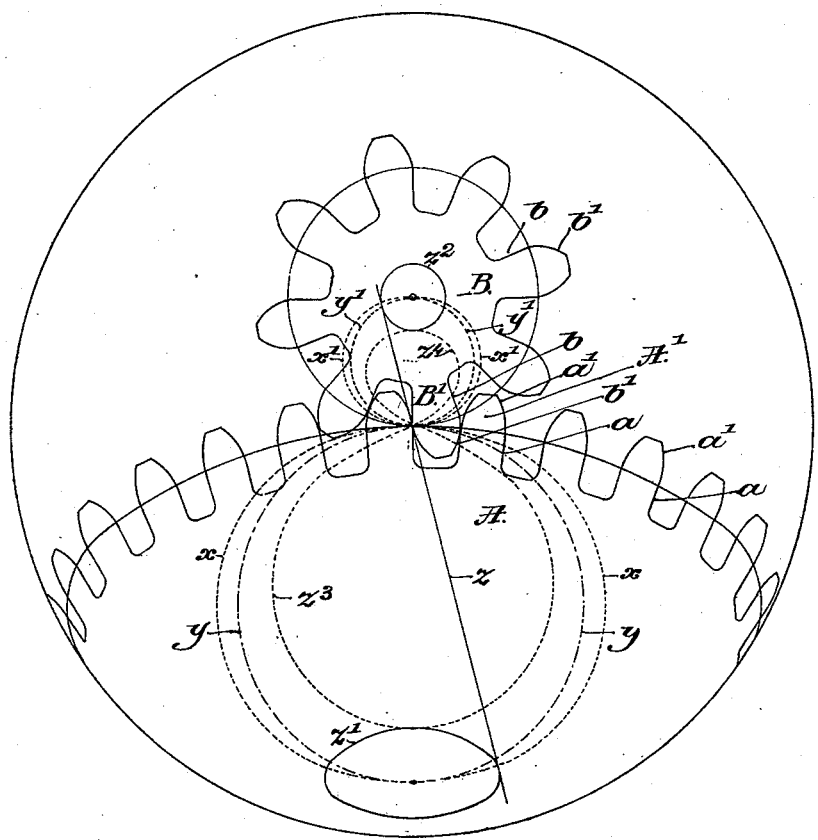
Fig. 2
Fig. 1
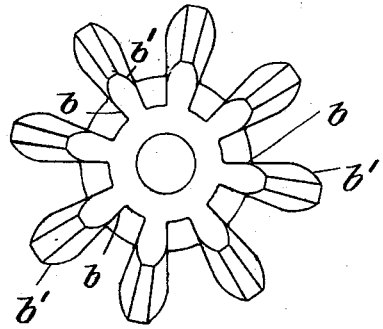
Witnesses.
Artie Harmon
Thomas J Drummond
Inventor.
George B. Grant,
by Crosby & Gregory
attys

UNITED STATES PATENT OFFICE.

GEORGE B. GRANT, OF LEXINGTON, MASSACHUSETTS.

BEVEL-GEAR.

SPECIFICATION forming part of Letters Patent No. 519,572, dated May 8, 1894.

Application filed November 27, 1893. Serial No. 492,186. (No model.)

*To all whom it may concern:*

Be it known that I, GEORGE B. GRANT, of Lexington, county of Middlesex, State of Massachusetts, have invented an Improvement in Bevel-Gear, of which the following description, in connection with the accompanying drawings, is a specification, like letters on the drawings representing like parts.

This invention has for its object the production of a bevel gear having a novel, theoretically correct, tooth.

A bevel gear embodying my invention has teeth, the flanks of which are planes, and faces which are curved surfaces conjugate to the plane flanks of a mating tooth. The term "conjugate" as herein used may be defined as follows, viz:—When the pitch circles of two mating gears are rolled together without slip, any curve on one gear is conjugate to a curve or line on the mating gear when it works in contact with the said curve or line during the rolling of the two pitch circles together.

This form of a bevel gear tooth, so far as I am aware, is entirely new and original with me, and, I, therefore, designate it the "planoid" bevel gear tooth, the name being taken from the peculiar curve of the face which I have termed a "planoid" curve.

To generate the curved tooth face of a planoid tooth embodying this invention, I employ a cutting tool, preferably a milling tool, having a straight cutting edge or edges which coincide with an imaginary plane in the position of the flank of a tooth with which the tooth being generated is to mate. The gear blank in which the tooth is to be generated or formed, and the cutting tool, are given a relative motion as of the pitch cones of the gear blank and mating gear (the latter pitch cone carrying the cutting tool) rolling one upon the other, whereby the cutting edge of said tool in moving in the position of the plane flank of the mating tooth, is caused to generate or sweep up a curved tooth surface conjugate to the plane flank of a mating tooth in the plane of which said cutting edge lies and coincides.

One form of apparatus for generating teeth upon a bevel gear embodying this invention is shown and described in my Patent No. 512,189, dated January 2, 1894, to which reference may be had.

In the accompanying drawings, Figure 1 represents in end view a bevel gear having teeth embodying my invention; and Fig. 2 represents upon the surface of a sphere, parts of the outlines of two meshing bevel gears embodying this invention, the lines of action of the teeth being shown by dotted lines, said drawings also showing the lines of action of the so-called radial flanked epicycloidal tooth, the nearest approach to my improved tooth and easily mistaken for it, in order that the invention and difference between it and this nearest approach to it may be clearly understood.

Referring to the drawings, Fig. 1, B is an end view of a gear embodying my invention, and in Fig. 2 A and B represent in outline upon the surface of a sphere, the gear shown in Fig. 1 and another in mesh therewith, said bevel gears having planoid teeth A', B', embodying my invention, the same having, respectively, flanks $a$, $a$, and $b$, $b$, which are planes, and faces $a'$, $a'$, and $b'$, $b'$, which are curved surfaces conjugate to the planes constituting the flanks of the mating tooth.

The flanks of my improved tooth may be of any desired practicable planes, they being preferably, however, planes which are radial with relation to the axis of the gear; and I have, therefore, herein illustrated my invention in connection with a radial flanked tooth, it being expressly understood that the invention is not restricted to the use of radial flanks.

I have shown my improved tooth with radial flanks, not only preferable because of convenience in manufacture, but also because it is the nearest like the so-called radial flanked epicycloidal tooth above referred to, from which it must be distinguished.

Referring to the drawings, the dotted lines $x$, $x$, and $x'$, $x'$, composed of short regular dashes, show the lines of action (i. e., the curved lines in arcs of which the moving points of contact between two mating teeth travel) of two mating radial flanked planoid teeth, said lines of action being non-circular, that is oval in shape, said lines of action, when the flanks of the teeth are radial, passing through the axes of the respective gears.

Where the flanks of the planoid tooth are not radial planes but planes drawn tangent to a circle or circles about the axis of the gear, as illustrated by the light line $z$, tangent to the circles $z'$, $z^2$, the lines of action $z^3$, $z^4$, of the teeth, instead of passing through the axes of the gears will be tangent to the circles to which the plane flanks of the teeth are tangent.

In order that my invention may be clearly understood it is necessary to compare my improved tooth with the form of tooth which is the nearest approach to it, viz:—the "so-called radial flanked epicycloidal tooth," in order that the difference between the two may be clearly understood.

It will be noticed that I speak of this nearest approach to my improved tooth, as the "so-called" radial flanked epicycloidal tooth. This is because there can be no theoretically correct epicycloidal tooth having flanks which are planes, for the face of an epicycloidal tooth is an epicycloid, and it is a demonstrable fact that if the face of a tooth is an epicycloid the mating flank must be a hypocycloid and not a plane; therefore a tooth having faces which are epicycloids and flanks which are planes is not and cannot possibly be a theoretically correct tooth and for this reason it cannot have a definite line of action. The true epicycloidal bevel gear tooth is a theoretically correct tooth, but it cannot have flanks which are planes.

Although the divergence of the flanks from the plane flanks of a planoid tooth is slight, yet there is a divergence which may be proven by comparing the lines of action of the two teeth.

Referring to the drawings, the dotted lines $y, y$, and $y', y'$, consisting of alternate long and short dashes, show the lines of action of two theoretically correct epicycloidal bevel gear teeth corresponding in size with the planoid teeth, also shown in said drawings, and it will be noticed that these lines of action are true circles passing through or intersecting the axes of the respective gears. While the line of action of a planoid tooth is never a true circle, the line of action of an epicycloidal bevel gear tooth is always a circle within the line of action of the radial flanked planoid tooth corresponding to it. The divergence between the lines of action of the two teeth compared is only slight, it being shown in the drawings somewhat exaggerated in order that it may be clearly understood, but the two lines of action for bevel gears can never coincide, though the divergence gradually lessens as the radius of the sphere increases until the radius of the sphere becomes infinite when the divergence disappears entirely, both forms of gear then becoming the common epicycloidal spur gear. While the divergence between the plane flank of the planoid tooth and the curved flank of the epicycloidal bevel gear tooth is only slight, yet in connection with the actual formation of the tooth it is a very material divergence, for while the plane flank of the planoid tooth may be easily and quickly formed by a simple cutting tool having a straight cutting edge or edges it has heretofore been found impracticable to form the slightly curved flank of the true epicycloidal bevel gear tooth. The difference between the two teeth then is the difference between a tooth which has never yet been practically produced and a tooth which can and has been practically produced.

It is not essential that the flanks of the planoid teeth of both gears of the mating pair be similar, for while it is preferable on account of simplicity and ease of construction that both should have radial flanks, yet one may have radial flanks, and the other flanks which are not radial.

I claim—

1. The herein described bevel gear having teeth the flanks of which are planes and the faces of which are curved surfaces conjugate to the plane flanks of the teeth of a gear with which the said bevel gear is adapted to work, substantially as described.

2. The herein described bevel gear, the same having teeth the flanks of which are radial planes and the faces of which are curved surfaces conjugate to the plane flanks of the teeth of a mating gear, substantially as described.

3. The herein described bevel gear, the same having teeth the flanks of which are radial planes and the faces of which are curved surfaces conjugate to the radial plane flanks of the teeth of a mating gear, substantially as described.

In testimony whereof I have signed my name to this specification in the presence of two subscribing witnesses.

GEO. B. GRANT.

Witnesses:
 FREDERICK L. EMERY,
 LAURA S. MANIX.